(No Model.)

W. MERRILL.
WOOD-CUTTING MACHINE.

No. 526,354. Patented Sept. 18, 1894.

WITNESSES:

William Merrill
INVENTOR

BY
ATTORNEY

UNITED STATES PATENT OFFICE.

WILLIAM MERRILL, OF SAGINAW, MICHIGAN, ASSIGNOR OF ONE-HALF TO SYLVANIS S. MITTS, OF SAME PLACE.

WOOD-CUTTING MACHINE.

SPECIFICATION forming part of Letters Patent No. 526,354, dated September 18, 1894.

Application filed May 24, 1894. Serial No. 512,298. (No model.)

*To all whom it may concern:*

Be it known that I, WILLIAM MERRILL, a citizen of the United States, residing at Saginaw, in the county of Saginaw and State of Michigan, have invented certain new and useful Improvements in Wood-Cutting Machines; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in wood cutting machines of the class which consists of a frame supporting a revolving cylinder carrying knives, represented by the machines described in my former application, Serial No. 453,386, filed November 28, 1892, and in my application, Serial No. 497,960, filed January 25, 1894.

The objects of my improvements are, first, to provide an improved form of cutters; second, to provide an improved means of holding them in position, and third, to provide more ready means of adjusting them to proper position. I attain these objects by the mechanism described in the accompanying drawings.

Figure 1:
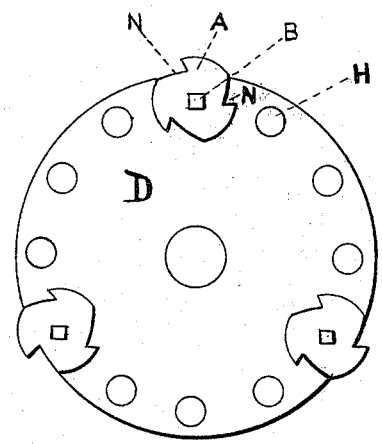
Figure 2:
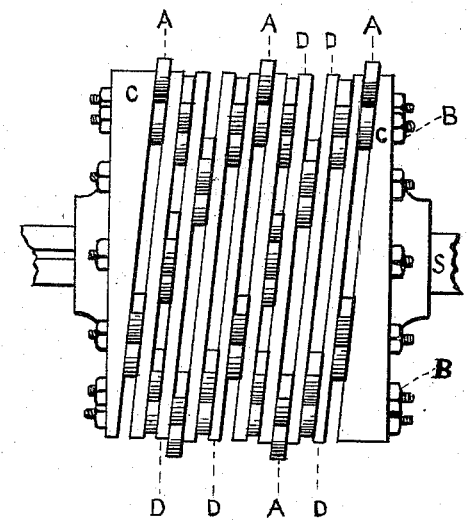
Figure 3:
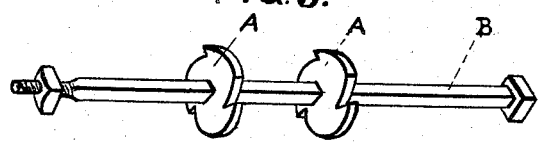
Figure 4:

Figure 1 is a side view of the disk D, and small saws A. Fig. 2 is an elevation of the cutting cylinder. Fig. 3 is a perspective of saws on their fastening bolt. Fig. 4 shows another form of saws.

In Fig. 2 one collar, C is fastened to the shaft S and the other collar may be loose on the shaft S, and between the two collars are any number of disks, D, with a number of holes H arranged equally distant from the center and equally distant from each other, and corresponding holes are made through the collars C, and through the holes are put clamping bolts B. The holes through the disks and collars are round and large enough to receive the square bolts B. The saws A are small circular disks in which are cut the notches N leaving the corners projecting, which form the cutting projections or teeth. These saws A have square holes to fit the bolts B, and by this means each saw is prevented from turning when the bolts are screwed up tight against the collars, clamping all the collars, disks and saws together. I prefer to place but three saws between adjoining disks, then in the next space put the saws on different bolts and so on throughout the cylinder.

When one tooth of the saws becomes dull, by turning the bolts B all the saws, A, which are on the bolt are turned at once to bring another set of teeth into position for use. If the bolt B were round, any one of the saws A which might be a trifle thinner than others, and therefore not securely clamped, would turn on the bolt when in use, but with this improved construction each saw is securely held from turning, even if it is not clamped tightly between the disks. Of course I do not limit myself to the one method shown of the square bolt in a square hole, as it is obvious that the bolt B may be of various shapes, which if fitted to corresponding holes in the saws A would hold them from turning. The collars and disks might be clamped together by a nut on the shaft S, and the bolt B be held from turning by other fastening devices.

The saws A or A', although having any convenient number of teeth, only one tooth at a time is cutting, and it is not necessary to remove them from the machine when one tooth becomes dull, for the sharp ones can be successively brought into position for use, and it is only necessary to take out the bolts and the saws when all the teeth have become dull, when they may all be sharpened and replaced.

The backs of the teeth of the saws A being circular and the teeth being sharpened by grinding against the front portion of the cutting edge, the diameter of the saws is not changed, and consequently the amount they project beyond the circumference of the disks D remains constant, which is of great importance in the successful operation of the machine, and in this respect they are better than A', Fig. 4. The collars C have their inner faces not square with the center of the shaft S, so that when clamped to the disks the cutters A cut in separate planes of revolution.

Having thus described my invention, what I claim as new, and desire to secure by Letters Patent, is—

1. In a wood cutting machine of the class described, a cutting cylinder composed of two collars and one or more disks of the size of the collars, and clamped between the collars, and small circular saws clamped between the collars and disks and between the disks, the circular saws being smaller than the radii of the cylinder and clamped near the edge of the disks so that one tooth of the circular saw projects beyond the periphery of the collars and disks, as and for the purpose set forth.

2. In a wood cutting machine of the class described, a cutting cylinder composed of two collars and one or more disks between the collars, and circular saws smaller than the radii of the cylinder and clamped near the edge of the collars or disks so that one tooth projects, the circular saws being provided with central apertures not circular in shape, and rods passing through the collars and disks and fitting the apertures in the circular saws to prevent them from turning, and nuts on the ends of the rods for clamping the collars, disks and circular saws together, as and for the purpose set forth.

3. In a wood cutting machine of the class described, a revolving cutting cylinder having secured to its body at regular distances small disk saws with one or more teeth of each saw projecting beyond the periphery of the cylinder and forming the cutting surface of the cylinder, as and for the purpose set forth.

4. In a wood cutting machine of the class described, a cylinder made of two collars having clamped between them one or more disks of like size, in combination with disk saws smaller than the radii of the cylinder and so secured in the cylinder that a portion of each saw will project beyond the periphery of the cylinder and form its cutting surface, as and for the purpose set forth.

5. In a wood cutting machine of the class described, a cylinder composed of collars with disks between them of the size of the collars, and circular saws smaller than the radii of the cylinder and clamped near the edge of the cylinder so that one tooth projects, the saws being provided with central apertures not circular in shape, and clamping rods passing through the cylinder and fitting the apertures of the saws whereby by turning the rod each tooth of the saws may be exposed in turn as desired and form the cutting surface of the cylinder, as and for the purpose set forth.

6. In a wood cutting machine of the class described, a revolving cutting cylinder having secured in its body at regular distances small disk saws so that one tooth of the saw projects, the saws having central apertures not circular in shape, and clamping rods not circular in cross section fitting the apertures of the saws whereby the saws may be held in place and turned as desired to expose different teeth without removal from the cylinder, as and for the purpose set forth.

In testimony whereof I affix my signature in presence of two witnesses.

WILLIAM MERRILL.

Witnesses:
A. H. SWARTHOUT,
FANNIE ROBBINS.